(12) United States Patent
Chung

(10) Patent No.: US 8,484,308 B2
(45) Date of Patent: Jul. 9, 2013

(54) SYSTEM AND METHOD FOR TRANSFERRING CONTENT VIA A NETWORK

(75) Inventor: Jack Chung, Vancouver (CA)

(73) Assignee: MatrixStream Technologies, Inc., San Francisco, CA (US)

( * ) Notice: Subject to any disclaimer, the term of this patent is extended or adjusted under 35 U.S.C. 154(b) by 1755 days.

(21) Appl. No.: 11/173,905

(22) Filed: Jun. 30, 2005

(65) Prior Publication Data

US 2006/0015637 A1    Jan. 19, 2006

Related U.S. Application Data

(60) Provisional application No. 60/585,025, filed on Jul. 2, 2004.

(51) Int. Cl.
*G06F 15/16* (2006.01)

(52) U.S. Cl.
USPC .......................................... 709/217; 709/231

(58) Field of Classification Search
USPC .............. 709/100, 231; 725/87, 88, 101, 102; 715/719, 720, 722; 375/240
See application file for complete search history.

(56) References Cited

U.S. PATENT DOCUMENTS

| | | | | |
|---|---|---|---|---|
| 5,893,091 | A * | 4/1999 | Hunt et al. | 707/3 |
| 6,064,794 | A * | 5/2000 | McLaren et al. | 386/343 |
| 6,370,688 | B1 * | 4/2002 | Hejna, Jr. | 725/101 |
| 7,343,614 | B1 * | 3/2008 | Hendricks et al. | 725/8 |
| 2002/0114331 | A1 * | 8/2002 | Cheung et al. | 370/390 |
| 2003/0008650 | A1 * | 1/2003 | Matsuyama et al. | 455/426 |
| 2003/0074667 | A1 * | 4/2003 | Cheung et al. | 725/95 |
| 2003/0080991 | A1 * | 5/2003 | Crow et al. | 345/716 |
| 2005/0021804 | A1 * | 1/2005 | Hameleers et al. | 709/231 |
| 2005/0268160 | A1 * | 12/2005 | Taylor et al. | 714/6 |
| 2009/0150946 | A1 * | 6/2009 | Rodriguez et al. | 725/87 |

* cited by examiner

*Primary Examiner* — Kevin Bates
*Assistant Examiner* — Kevin Mai
(74) *Attorney, Agent, or Firm* — Trellis IP Law Group, PC

(57) ABSTRACT

A system for delivering content, such as video content, via a network. In an illustrative embodiment, the system includes a server system that is connected to the network and has access to the content. A client system is adapted to forward a request for the content to the server system via the network. One or more content-delivery routines in communication with the server system are adapted to initiate sending of the content to the client system via multiple streams over the network in response to the request.

4 Claims, 4 Drawing Sheets

SYSTEM AND METHOD FOR TRANSFERRING CONTENT VIA A NETWORK

CLAIM OF PRIORITY

This invention claims priority from U.S. Provisional Patent Application Ser. No. 60/585,025 filed Jul. 2, 2004, which is hereby incorporated by reference as if set forth in full in this specification.

BACKGROUND OF THE INVENTION

This invention is related in general to networks, and more specifically, to systems and methods for transferring information, such as video content, via a network.

Systems and methods for transferring information via a network are employed in various demanding applications including video conferencing, network gaming, Video-On-Demand (VOD), and general file-transfer applications. Such applications demand efficient transfer of information with minimal glitches, errors, and consumption of network resources.

Efficient content-transfer systems and methods are particularly important in VOD applications, where timely transfers of excessively large video files are critical. Conventionally, a VOD system running on a client computer will download one or more video files from a remote location via a network in response to user input. Unfortunately, existing file transfer and download-scheduling techniques employ relatively inefficient protocols characterized by slow download times and network-traffic bottlenecks. Such inefficient data-transfer protocols limit VOD quality and functionality. The resulting dearth of viewing features and related functionality and quality afforded by existing VOD systems reduces the popularity of such systems.

SUMMARY OF THE INVENTION

Certain embodiments of the present invention provide a system for delivering content, such as video content, via a network. One embodiment includes a server system that is connected to the network and has access to the content. A client system is adapted to forward a request for the content to the server system via the network. One or more content-delivery routines in communication with the server system are adapted to initiate sending of the content to the client system via multiple streams over the network in response to the request.

In a more specific embodiment, the network is a best-effort network. The server system includes a server cluster comprising plural servers. The server system further includes an interface appliance in communication with the server system. The interface appliance facilitates controlling delivery of the content via the server system. The interface appliance accommodates a web browser and accompanying interface, which are adapted to facilitate configuring the server system.

In the specific embodiment, the client system includes a client interface that receives user input, which may affect the request for the content sent from the client system to the server system. The client interface further includes or communicates with a display for presenting the content, which includes video content. The client interface further includes one or more menus configured to provide access to auxiliary content that is related to the video, including video chapter information. The client interface further includes one or more content menus adapted to facilitate selecting content.

Various advantages provided by certain embodiments of the present invention are particularly enabled by use of plural data streams between a client and a content source, such as a server system. Use of plural data streams significantly improves delivery of bandwidth-intensive content, such as video, over best-effort networks, which lack Quality Of Service (QOS) guarantees. Use of plural data streams helps to stabilize content-transfer rates and to increase acceptable content transfer rates. Furthermore, auxiliary data streams provide auxiliary information that enables embodiments of the present invention to offer greatly enhanced functionality over conventional network-based content-delivery systems, such as conventional VOD systems.

Unlike conventional VOD systems, certain embodiments of the present invention may employ the plural data streams to implement DVD-player functionality. For example, features such as fast-forward, rewind, pause, language selection, chapter controls, actor interviews, director biographies, and so on, which are not typically provided by VOD systems, may be provided via VOD systems constructed according to embodiments of the present invention.

DETAILED DESCRIPTION OF EMBODIMENTS OF THE INVENTION

For clarity, various well-known components, such as power supplies, communications ports, hubs, modems, gateways, firewalls, network cards, Internet Service Providers (ISPs) and so on, have been omitted from the figures. However, those skilled in the art with access to the present teachings will know which components to implement and how to implement them to meet the needs of a given application.

Figure 1:
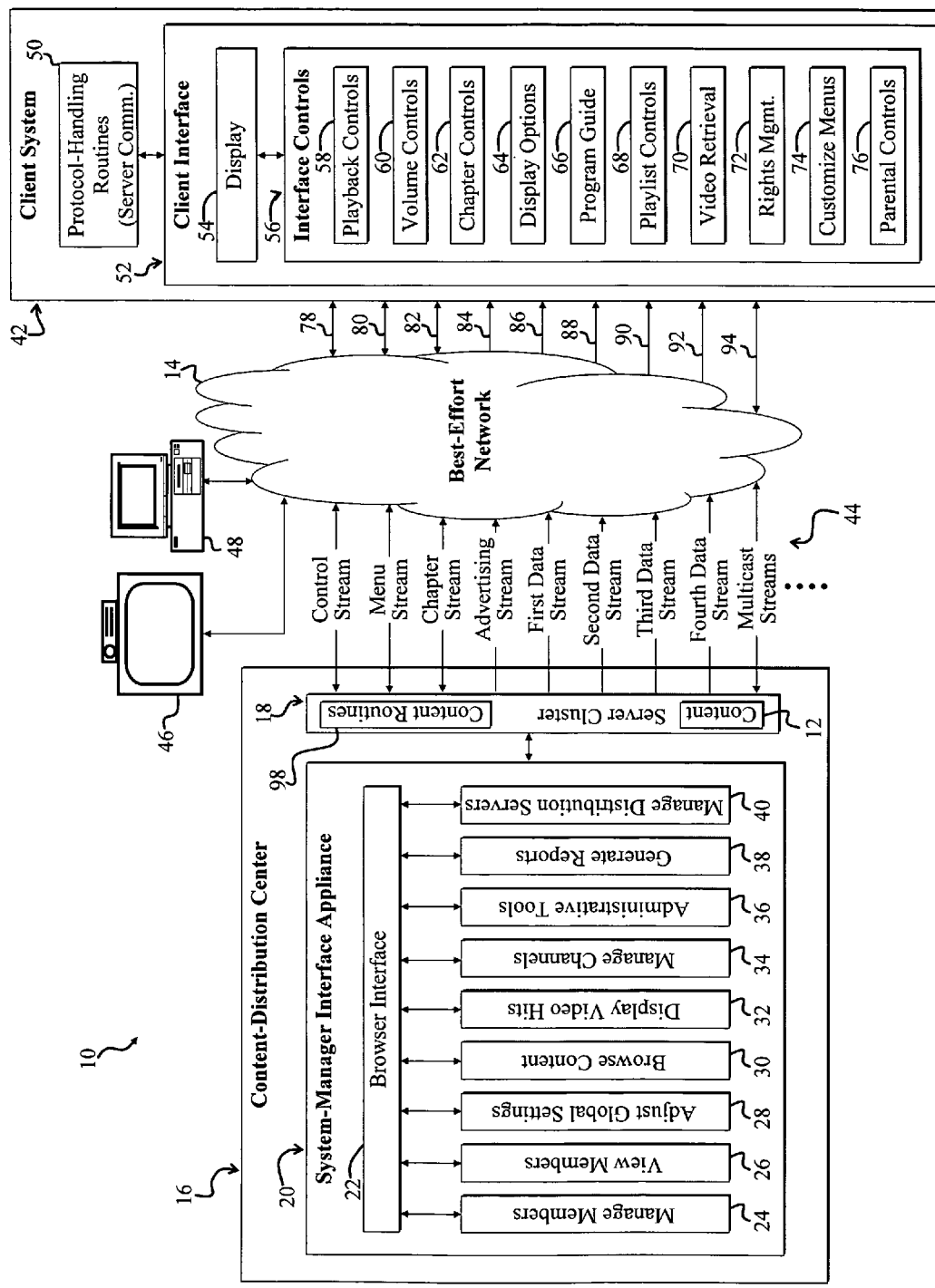
FIG. 1 is a diagram of a system for facilitating delivery of content via a network according to an embodiment of the present invention.

FIG. 1 is a diagram of a system 10 for facilitating delivery of content 12 via a network 14 according to an embodiment of the present invention. The system 10 includes a content-distribution center 16 that includes a server cluster 18 and a system-manager interface appliance 20, which communicates with the server cluster 18. One or more servers of the server cluster 18 store the content 12, which may include video content, such as movies. The system-manager interface appliance 20 includes a user friendly web-browser interface 22, which enables a user, such as an administrator, to control the operation of the overall system 10, in part by controlling the operation of the server cluster 18 through various control modules. The various control modules include a manage-members module 24, a view-members module 26, an adjust-global-settings module 28, a browse-content module 30, a display-video-hits module 32, a manage-channels module 34, an administrative-tools module 36, a generate-reports module 38, and a manage-distribution-servers module 40. The browser interface 22 may include one or more image maps, hyperlinks, or other mechanisms to activate one or more of the modules 24-40 in response to user input. The modules 24-40 enable a user of the system-manager interface appliance 20 to manage members, view identities of members, adjust global settings for the system 10, browse offered content 12, display the numbers of hits or views per movie via the browser interface 22, manage channels and data streams, perform various administrative functions, generate reports, manage distribution servers of the server cluster 18, and so on.

The server cluster 18 includes plural servers running content-delivery routines 98, which employ plural communication streams 44 to communicate with and provide content to various client systems via the network 14. For illustrative purposes, the various client systems are shown including a first client system 42, a Set-Top Box 46, and a Personal Computer (PC) system 48. The client system 42 may be implemented via any type of client, including an STB, a PC, or other computer. For the purposes of the present discussion, a computer is any processor in communication with a memory. Consequently, televisions, Personal Digital Assistants (PDAs), cell phones, and so on, are considered computers and represent suitable playback control devices, which act as clients. Although it is contemplated that a control and playback system are one and the same, other applications can use a control system that is separate from a playback system, as for example, when a control instruction, such as selection of a video for playback, is used to send the content to multiple playback platforms or displays in a household or movie theater.

The first client system 42, which is shown in more detail than the STB client 46 or the PC client 48, includes a protocol-handling module 50 in communication with a client-interface system 52. The client-interface system 52 includes a display 54, which communicates with plural interface-control modules 52. The interface-control modules 56 include playback controls 58, volume controls 60, display controls 62, a display-options module 64, a program guide module 66, playlist controls 68, a video-retrieval module 70, a rights-management module 72, a menu-customization module 74, and parental controls 76. Additional modules and functionality may be employed, or certain modules may be removed from the interface-control modules 56 without departing from the scope of the present invention. Each of the interface controls 58-76 may be associated with one or more buttons, fields, links, screens, or other interface objects, which are displayed via the display 54 and are responsive to input from a user of the client system 42.

The protocol-handling module 50 interfaces the client-interface system 52 with content stored in a memory (not shown) of the client system 42, and with the communication streams 44 between the client system 42 and the network 14. In the present illustrative scenario, the communication streams 44 include a control stream 78, a menu stream 80, a chapter stream 82, an advertising stream 84, a first data stream 86, a second data stream 88, a third data stream 90, a fourth data stream 92, and multicast streams 94. The various communication streams 44 enable a user of the client system 42 to selectively retrieve and interact with video content 12. The content 12 may be content other than video content without departing from the scope of the present invention. For example, the content 12 may represent electronic books, software, music, and so on.

One or more of the communication streams 44 may be consolidated without departing from the scope of the present invention. For example, the four data streams 86-92 may be consolidated into two data streams; and the control stream 78, menu stream 80, and chapter stream 82 may be combined into two or fewer streams. Furthermore, streams may be separated in to different streams, or other additional streams between the distribution center 16 and the client system 42 may be employed, without departing from the scope of the present invention.

In operation, a user of the client system 42 may employ the video-retrieval module 70 and the rights-management module 72 to log-in to the content-distribution center 16, by entering a username, password, and/or other authentication parameters. Certain authentication routines running on the video-retrieval module 70 and/or the rights-management module 72 employ the protocol-handling module 50 to establish a control channel 78 between the client system 42 and corresponding authentication routines running on the server cluster 18. Certain conventional systems and routines for logging-in to a remote server or cluster of servers may be employed to authenticate the client system 42, without departing from the scope of the present invention.

After the user of the client system 42 is authenticated, the user may employ the menu-customization module 74 to customize user-interface menus displayed via the display 54. The menus may be customized for each movie or other content retrieved from the content-distribution center 16. In response to activation of the menu-customization module 74, the protocol-handling module 50 establishes the menu stream 80 between the content-distribution center 16 and the client system 42 to retrieve customizable menu information from the server cluster 18. The customizable menu information is associated with the particular movie or other content to be viewed via the display 54 of the client system 42. A user may employ the parental controls 76 to also configure menus, establish passwords, or perform other functions to inhibit use of the client system 42 and accompanying client interface 52 by children or other unauthorized users.

After authentication, a user of the client system 42 may employ the program guide 66, the playlist controls 68, and/or the video-retrieval module 70 to select and/or schedule content 12 for viewing. For example, the client system 42 may be configured to immediately download a particular movie for viewing via the video-retrieval module 70. The protocol-handling system 50 then employs a unique protocol, as discussed more fully below, to initiate transfer of the movie 12 from one or more servers of the server cluster 18 to the client system 42 via the best-effort network 14. The protocol-handling system 50 selects a primary contact server from the server cluster 18 to facilitate delivering the movie 12. The protocol-handling system 50 then initializes the communication streams 44 for the particular movie content 12. In the present example, the control stream 78, the chapter stream 82, and the four data streams 86-92 are initialized via the protocol-handling routines 50 and corresponding routines running on the server cluster 18. Those skilled in the art with access to the present teachings may readily construct such routines without undue experimentation. Alternatively, the routines may be ordered from MatrixStream Technologies, Inc.

The chapter stream 82 enables a user of the client system 42 to select or jump to viewing particular chapters which are being downloaded via the data streams 86-92. A user may begin viewing a chapter or video via the client system 42 before the entire chapter or video is transferred to the client system 42.

The protocol-handling module 50 employs control stream 78 to adjust download parameters as needed for a particular download operation. For example, the protocol-handling module 50 may run routines to monitor transmission progress and/or network performance and latency characteristics and then increase or decrease the number of data streams employed to transfer the movie 12 over the best-effort network in response thereto.

Subsequently, the desired movie is transmitted in chapters via the plural data streams 86-92. In the present embodiment, four video data streams 86-92 are chosen to transfer video content via the best-effort network 14 to the client system 42. However, different numbers of data streams may be employed to meet the needs of a given implementation without departing from the scope of the present invention.

In the present embodiment, the network 14 is a best-effort network, such as the Internet or other Transmission Control Protocol/Internet Protocol (TCP/IP) network. For the purposes of the present discussion, a best-effort network is a network that does not provide Quality-Of-Service (QOS) guarantees. The performance of a best-effort network varies based on network usage and other factors, which are often difficult to predict.

Conventional content-delivery systems are often subject to download glitches when the performance of the download data stream being transferred through a best-effort network drops below a predetermined level or fluctuates by more than a predetermined degree. Use of the multiple data streams 86-92 provides plural significant advantages over conventional VOD systems and accompanying protocols. The advantages are particularly pronounced in applications involving large file transfers over best-effort networks. Use of multiple streams 86-92 enables the system 10 to transfer content efficiently over the best-effort network 14 without requiring QOS network functionality.

In particular, unlike certain conventional VOD systems, file transfer performance characteristics no longer depend entirely upon performance fluctuations of a single data stream. By employing plural data streams, the performance fluctuations of each data stream 86-92 average, thereby stabilizing the overall download rate and limiting packet losses. Hence, content-transfer rates are relatively stabilized in the presence of variable network congestion.

Furthermore, use of plural data streams capitalizes on another network property to improve content-transfer rates. In particular, in a given network, data upload rates for a particular data stream are often slower than data download rates. Slow upload rates may reduce overall link bandwidth. Consequently, simultaneously uploading or pushing content to the client system 42 via plural data streams may increase the overall bandwidth between the content distribution center 16 and the client system 42. This aspect is particularly noticeable in applications wherein servers of the server cluster 18 exhibit relatively slow upload rates.

Users of a given VOD system often compete for bandwidth. If a link or particular data stream becomes congested, such that demand for bandwidth is higher than the link capacity, packets are dropped. Traffic conditions affecting congestion often change randomly. The server cluster 18 may place additional servers or server resources online as needed to meet the needs of a given demand and to further stabilize content-transfer rates.

In the present specific embodiment, the server system 18 employs accompanying content-delivery routines 98 to determine a desired download rate, i.e., content-transfer rate, and a desired fluctuation of the content-transfer rate. Certain content-delivery routines 98 monitor the condition of the network, such as network latency and congestion parameters, and provide a signal in response thereto. The content-delivery routines 98 and the protocol-handling routines 50 running on the client system 42 then employ a specific number of the communication streams 44 to facilitate content transfer between the server cluster 18 and the client system 42. The specific number of communication streams 44 is selected by the content routines 98 so as to stabilize the transfer rate in accordance with the desired download rate, the desired fluctuation of the download rate, and the signal.

The system 50 employs additional systems and methods to overcome problems associated with delivering video content over the best-effort network 14. In particular, the server cluster 18 automatically pushes content 12 that is likely to be requested by users of the client systems 42, 46, 48 before the users request the content 12. For example, in the present embodiment, the server cluster 18 pushes the top ten requested movies and the latest movie releases to the client systems 42, 46, 48 automatically, such as before the users request the content. Consequently, when the users of the client systems 42, 46, 48 are watching download movies or when they are away from the systems 42, 46, 48, the client systems 42, 46, 48 may be receiving pushed content from the content-distribution center 16. The pushed content is trickled from the server cluster 18 to the client system 42 via plural data streams, such as the four video data streams 86-92.

Selective pushing, also called preloading, facilitates viewing variable-bit-rate video via the client system 42. Server software running on the server cluster 18 may initiate parallel video data streams 86-92 to deliver the video to the client system 42 in addition to a session data stream, i.e., control data stream 78, to command the client system 42, and the menu data stream 80 to deliver menu information from the server cluster 18 to the client system. Data corresponding to the different streams 44 may be preloaded or stored on the client systems 42, 46, 48 for use when needed.

Selective pushing in accordance with the present teachings helps stabilize transfer rates and reduce network traffic spikes that might otherwise occur when several users attempt to simultaneously retrieve a given movie from the content-distribution center 16. Selective pushing reduces network bandwidth and performance requirements.

One or more servers of the server cluster 18 may push content to the various client systems 42, 46, 48 via multicast data streams 44. In the present specific embodiment, the multicast data streams 44 each include the four data streams 86-92 and the auxiliary streams 78-84 as needed for particular content.

When a user of one of the client systems 42, 46, 48, such as the first client system 42, initiates a request to retrieve a particular movie via the video-retrieval module 70, the protocol-handling module 50 and corresponding modules running on the server cluster 18 determine if the requested content is currently being multicast. If the content is being multicast to plural users, the corresponding communication streams 78-92 are switched to corresponding multicast data streams.

For the purposes of the present discussion, multicasting of information includes automatically determining whether it is optimal for the client system 42 to retrieve data from a multicast stream. The server cluster 18 can automatically synchronize with the client system 42 to ensure that not too many clients try to join the multicast group. If too many client requests exist, the server cluster 18 requests that all of the client systems 42, 46, 48 wait and synchronize until a beginning of a next video multicast.

When the server cluster 18 initializes the client system 42 to join a multicasting group, the client system 42 will start to downstream the multicast video. However, if the beginning piece of the video is missing (e.g., when the client joins the multicast group when the video has already started), the client system 42 automatically initiates a separate stream to retrieve the missing beginning piece of the video.

Multicasting anticipates pushing video onto a client device's hard drive or set-top box storage automatically. Once the video is completely pushed onto the hard drive, a menu system, such as implemented via the customize-menus module 74 and display 54, automatically shows the end user that the video is available. When the user selects the video, the user may then view the video instantly.

Another aspect of the present embodiment provides a menu and communication protocol as implemented in part via the protocol-handling module 50, which allows the streaming VOD system 10 to provide many DVD-type features, including rewind, fast forward, pause, chapter-access, and so on. User interaction with the streamed video production can include transport control, chapter and scene selection, related content (e.g., the "making of the movie," biographies of actors, etc.), interactive games and other features. An exemplary menu sequence illustrating functionality afforded in part by the client system 42 is discussed more fully below.

One aspect of the present embodiment involves sending video menu information as a separate data stream 80 from the video content 86-92. The video menu stream 80 is a type of auxiliary data stream that can be sent independently of the video content 86-92 to which it relates. The video menu stream 80 facilitates enabling a user of the client system 42 to select features that are commonly associated with DVD playback on a standard, standalone DVD player. Optionally, the control stream 78 implements a video-index data stream, which enables fast forward and rewind video functions, which are activated via the playback-controls module 58 of the client interface 52.

Other types of auxiliary data streams include the advertising stream 84 for presenting advertisements to the client system 42, the chapter stream 82 for providing user-interactive chapter selection and viewing, and the control stream 78 for managing video playback and providing various additional capabilities. The additional capabilities may include enabling a user of the client system 42 to control the number of data streams 86-92 that are employed to retrieve content from the server cluster 18.

A system administrator may employ the system-manager interface appliance 20 to facilitate controlling the behavior of the system 50. For example, an administrator may employ the browser interface 22 to activate the manage-distribution-servers module 40 to choose the movies that will be pushed to the client systems 42, 46, 48 and to choose the times at which pushing will commence. An administrator may employ the manage-members module 24 to control which members may receive content from the content-distribution center 16. The view-members module 26 incorporates routines that enable the administrator to view all members that are currently logged into the content-distribution center 16. The adjust-global-settings module 28 may be employed to adjust parameters that may globally affect the system, such as channel names and license-acquisition information. The browse-content module 30 may enable the administrator to browse content 12 offered to the client systems 42, 46, 48 via the server cluster 18. The display-video-hits module 32 may enables the administrator to display the numbers of requests for each type of content 12, such as for each movie, offered by one or more servers of the server cluster 18. The manage-channels module 34 enables the administrator 34 to encrypt or re-package videos for distribution; to manage advertising, such as by adding, deleting, or editing banners to be transferred to the client systems 42, 46, 48 via the advertising stream 84; and to verify the status of encrypted content. The administrative-tools module 36 facilitates administrator control over various system aspects, such as which videos and advertising are presented and when. The generate-reports module 38 may enable an administrator to generate various reports, such as bandwidth-usage reports. The administrator may employ the manage-distribution-servers module 40 to selectively place online or take offline certain servers of the server cluster 18.

The various modules 24-40 are shown for illustrative purposes. Exact details of the modules 24-40 are application specific. Those skilled in the art with access to the present teachings may delete various modules, add certain modules, or change the functionality of the modules to meet the needs of a given application, without departing from the scope of the present invention.

The server cluster 18 and the protocol-handling module 50 running on the client system 42 may further implement routines that enable an administrator employing the system-manager interface appliance 20 to selectively delete videos cached or otherwise stored on the client system 42. Content providers may also employ the system-manager interface appliance and one or more of the accompanying modules 24-40 to control the length or viewing period of the content 12 and to set expirations, such the content 12 is deleted from the client system 42 after expiration of the content.

The protocol-handling module 50 incorporates additional routines that periodically query the server cluster 18 via the control stream 78 to ensure that the client system 42 is running the latest software. If new software updates are detected by the protocol-handling module 50, then the software updates may be retrieved by the client system 42 from the server cluster 18 of the content-distribution center 16 via one or more of the data streams 84-92. The protocol-handling module 50 may then install the updates as needed or when appropriate.

The server cluster 18 may be implemented via plural servers, such as I-MX servers. For example, in one implementation, the system-manager interface appliance 20 communicates with a central I-MX management server (not shown) contained within the server cluster 18 to control how users view videos from the client systems 42, 46, 48. The I-Mx management server may authenticate an administrator employing the browser interface 22 before allowing the administrator to access secure web-based content management functions implemented via the HyperText Transport Protocol (HTTP) browser 22.

Various types of I-MX servers may be included in the server cluster 18. Suitable I-MX servers may be ordered from MatrixStream Technologies, Inc. The I-MX servers be readily configured to provide requisite VOD features, including reliability, scalability, High Definition Television (HDTV)/Digital Video Disk (DVD) quality and functionality, subscriber and video management, billing support, end-to-end video encryption, and support for the client systems 42, 46, 48. In the present specific embodiment, the I-MX servers of the server cluster 18 include one or more I-MX C2000s (video-delivery servers), S2100s (video-storage servers), and M2200s (video-management servers). The resulting server cluster 18 supports multiple video codecs. For example, the system 50 may accommodate MPEG4, WM9, H264, and other video formats.

Unlike conventional VOD server systems, which are based on centralized architectures that may scale to a few thousand users, I-MX server cluster 18 may scale to millions of users. Furthermore, such server systems facilitate implementing an integrated billing system (not shown). The I-MX 2200 video-management server includes an open Application Programming Interface (API) that enables customized billing solutions, membership-support features, and is further compatible with industry-standard third party billing software, such as Ccbill and Ibill. Various client operations, including software updates, user access permissions, programming, programming content, and so on, may be remotely managed via an M2200 management server implemented in the server cluster 18.

The built-in web-based management tools 24-40 enable an administrator to control virtually all functions of the I-MX server cluster 18, including video upload management, video security and user-membership management, advertising, billing, video delivery, and so on. Service providers may manage the entire VOD system 10 and accompanying service form a single computer designed to implement the content-distribution center 16.

The I-MX 2000 series television video servers incorporated in the server cluster 18 may provide additional support for support authentication, including support for user password login functions. Additional functionality, which may be implemented via an I-MX 2000 server, includes content-upload features, including web-based video upload via the browser 22 or other upload client. Consequently, an administrator, such as a service provider, may employ the browser 22 to upload content 12 to the server cluster 18 from other web-accessible sources. Additional batch functions may allow operators to automate the distribution of large volumes of videos.

The I-MX server family, which is employed to implement the server cluster 18 in the present embodiment, is readily configurable to support the unique protocols employed by the client systems 42, 26, 48. The server cluster 18 incorporates support for scalable video delivery, such that the numbers and quantities of movies delivered may readily scale to address client demand. The server clusters 18 may deliver content using any IP port on a client system 42. Consequently, the system 50 is readily adaptable to work with various firewalls, which guard certain ports, but may enable communications on other ports.

The server cluster 18 implements Electronic Program Guide (EPG) functionality. An EPG may be formed via the browser interface 22, which enables the administrator to upload to or otherwise associate videos with a given EPG. The system-manager interface appliance 20 incorporates one or more modules that enable programmed content 12 to be released to the client systems 42, 46, 48 automatically, i.e., pushed to the clients automatically at predetermined times. The EPG may be cached locally on the client system 42 to reduce server traffic. The content provider may control the EPG via the system-manager interface appliance 20.

I-MX servers of the server cluster 18 employ cluster technology to facilitate automated fault tolerance and fail-over. Consequently, no hardware load balancer is required for fault tolerance. One or more of the servers of the server cluster 18 support multilingual EPGs, which may be transferred to the client systems 42, 46, 48, which may be implemented as thin clients. Thin clients are stripped-down network clients designed for a specific task, which is retrieving and viewing VOD content in the present embodiment.

A user of the client system 42 may access the EPG provided by the server cluster 18 to the client system 42 by activating the program-guide module 66. In the present embodiment, the program-guide module 66 further enables a user to view content by category, browse the EPG, navigate between EPG pages, view movie descriptions, jump to specific locations in the EPG, and to list content available on the hard drive or other memory of the client system 42 and content available from the server cluster 18.

The playback controls 58 provide features commonly found in a DVD players, including play, pause, rewind, and fast-forward features. Other examples of playback controls that may be implemented in part via the playback-control module 58 include parental-control checking, displaying movie play time, and so on.

The volume controls 60 enable a user to adjust the playback volume of content. The volume controls may include, mute, graphical equalizer, and other audio functionality.

The chapter controls 62 implement functionality sufficient to allow a user to select particular chapters of content stored on the server cluster 18 or in memory on the client system 42 for viewing. If the desired content resides on the server cluster 18 and has not been retrieved by the client system 42, then selection of the chapter-controls module 62 activates a chapter-selection signal. The chapter-selection signal is sent to the server cluster 18 via the chapter stream 82 and the protocol-handling module 50 running on the client system 20. The chapter-selection signal may trigger sending of chapter information pertaining to the desired content from the server cluster 18 to the client system 42. Upon selection of a particular chapter, the client system 42 may then forward a request for a particular chapter or other section of a particular video or other content to the server cluster 18. Upon receipt of the request and after any requisite authentication of the client system 42 or associated chapter request, the server cluster 18 may then forward the content of the requested chapter to the client system 42 via the data streams 86-92. The requested chapter may be streamed, pushed at a specific time, or otherwise transferred to the client system 42 for viewing.

Alternatively, the chapter information pertaining to a particular downloaded, streamed, or otherwise transferred content is transferred simultaneously to the client system 42 via the chapter stream 82 along with the content, which is transferred via the content data streams 86-92. In this implementation, the chapter information represents auxiliary information that is transferred from the server cluster 18 to the client system 42. The auxiliary information includes navigation data that enables a user of the client system 42 to select a desired chapter or other portion of the content for viewing.

For the purposes of the present discussion, auxiliary content is any content other than the video itself, such as chapter information, alternative language content, director biographies, and so on. Auxiliary information transferred from the server cluster 18 for particular content 12, which are transferred via communication streams different than the content data streams 86-92, enhance the content viewing experience and functionality afforded by the client system 42.

For example, menu information associated with a particular movie may be retrieved by the client system 42 via the menu stream 80. The menu-customization module 74 may then employ the menu information to display a customizable menu upon selection of the module 74 by a user of the client system 42. Hence, the menu-customization module 74 provides a user-option to select one or more custom video menus that are each associated with a custom-menu data stream 80. Each video may be associated with a different selection of custom-menu data streams 80. Each custom-menu data stream 80 represents a bi-directional stream, wherein data may be transferred back and forth between the client system 42 and one or more video servers of the server cluster 18 that are communicating with the client system.42.

The server cluster 18 and the protocol-handling module 50 are configured to communicate via the best-effort network using the communication streams 44, which are parallel-encrypted data streams. One skilled in the art may employ Request For Comment (RFC) 1323 Transmission Control Protocol (TCP) with a window size larger than 128 kilobytes with a video menu data stream 80 containing menu data corresponding to multiple video subtitles. Each of the parallel data streams 86-92 may start at the beginning of each menu chapter.

Additional auxiliary information, such as video programming, is either accessed by the protocol-handling module 50 from the memory of the client system 42 or retrieved from the server cluster 18 in response to selection of the program guide module 66 of the client system 42. Auxiliary information is transferred as needed from the server cluster 18 to the client system 42 to enable various functions afforded by the interface controls 56.

The display-options module 64 may enable full-screen viewing and other display options. Various display options are application-specific.

The rights-management module 72 incorporates Digital-Rights-Management (DRM) functionality that limits content piracy and enables only authenticated systems employing the DRM module 72 to view content 12 retrieved from the content-distribution center 16. The module 72 may include functionality needed to retrieve licenses from memory, decode DRM-protected content, and to retrieve licenses from the server cluster 18.

The rights-management module 72 facilitates implementing triple-layer security, including user tracking, as required to meet stringent movie-industry security requirements. Content is secured and encrypted on the video client system 42 and may be viewed only via the client system 42 or other authorized client 46, 48. The various client systems 42, 46, 48 may be implemented via an I-MX video client constructed according to the present teachings. An I-MX 1100 video client, which may be employed to facilitate implementing the client system 42, may be ordered from MatrixStream Technologies, Inc.

The playlist controls module 68 enables a user to assign specific content to a playlist, view content in the playlist, play content from the playlist, delete content from the playlist, arrange content in the playlist, create new playlists, view existing playlists, and so on. Certain playlist functionality may be omitted or added without departing from the scope of the present invention.

The video-retrieval module 70 enables a user to at least partially control the way the client system 42 retrieves content from the server cluster 18. For example, videos for retrieval from the server cluster 18 may be queued for retrieval via the video-retrieval module 70. Content may also be added or removed from the queue. The video-retrieval module 70 may also enable a user to control whether a video is scheduled for push or scheduled for streaming. Furthermore, a user may selectively stop content streaming or downloading, and the user may determine how many of the four data streams 86-92 are employed to retrieve content from the server cluster 18. Furthermore, the user may employ the video-retrieval module 70 to view content downstreaming progress via the display 54.

The video-retrieval module 70 may also implement authentication functionality, such as server-login, server date and time synchronization, server location information, and so on. The retrieval module 70 may also initiate transfer of configuration information from the server cluster 18, which is employed by the client system 42 to configure the client system 42 to appropriately handle content from the server cluster 18.

A user of the client system 42 may also employ functionality provided by the video-retrieval module 70 to select operational modes of the client system 42. In a first operational mode, content is continually downloaded 24 hours per day if needed. In a second operational mode, a user may select content, such as from an EPG, to activate playback of the content from a hard drive or other memory of the client system 42. For video that has not been preloaded, selecting the content by a user via a menu may initiate transferring of the content from the server cluster 18 to the client system 42 via one of several configurable retrieval modes, including downloading, streaming or multistreaming, pushing, and so on.

Hence, the client system 42 and accompanying modules 50, 52 enable a user to interact with the client system 42 to select a desired operational mode. For example, a customer can configure the client system 42 so that the top 10 most requested videos are pushed by the server cluster 18 to the client system 42 before the user wishes to view the videos. Less popular videos or videos that are less likely to be experiencing data crunches may be scheduled for immediate delivery. This functionality further reduces network traffic bottlenecks and associated problems.

Upon selecting the desired transmission mode, such as streaming, pushing, and so on, and upon retrieving the desired content, a user may then view the content via the display of the client system 54 while having full access to DVD menus, chapter controls, and so on. The information needed to implement the DVD menus, chapter controls, and so on, is retrieved via one or more of the auxiliary communication streams 78-84. The operation of various DVD functions, such as DVD menus, is independent of the content-retrieval mode.

To extract DVD menu information corresponding to a particular movie DVD, the menus of the DVD are extracted, digitally encoded, and transferred to the server cluster 18 in preparation for implementation via the client system 18. Exact methods for extracting and digitally encoding DVD menu information from an existing DVD are application-specific. One skilled in the art with access to the present teachings may readily extract DVD menu information or create new DVD menu information as required for a particular implementation of an embodiment of the present invention.

Certain modules 58-76, collectively called interface controls 56, may be deleted, or additional modules may be added without departing from the scope of the present invention. Those skilled in the art with access to the present teachings may readily construct or order various modules discussed wherein without undue experimentation.

Hence, the system 10 implements a VOD system that exhibits plural beneficial features that enable rapid, glitch-free movie watching with DVD functionality, including pause, fast forward, rewind, access to video chapters, playback and selection of auxiliary video programs, such as actor biographies, and so on. The system 10 further enables users to view electronic program guides; access specific chapters of a movie; download, stream, or otherwise receive specific chapters; selectively download movies at specific times; receive pre-scheduled push content from the content-distribution server; selectively receive multicast movies from the content-distribution center; customize video menus; select between various video-retrieval modes, including downloading, pushing, and streaming; and so on.

Figure 2:
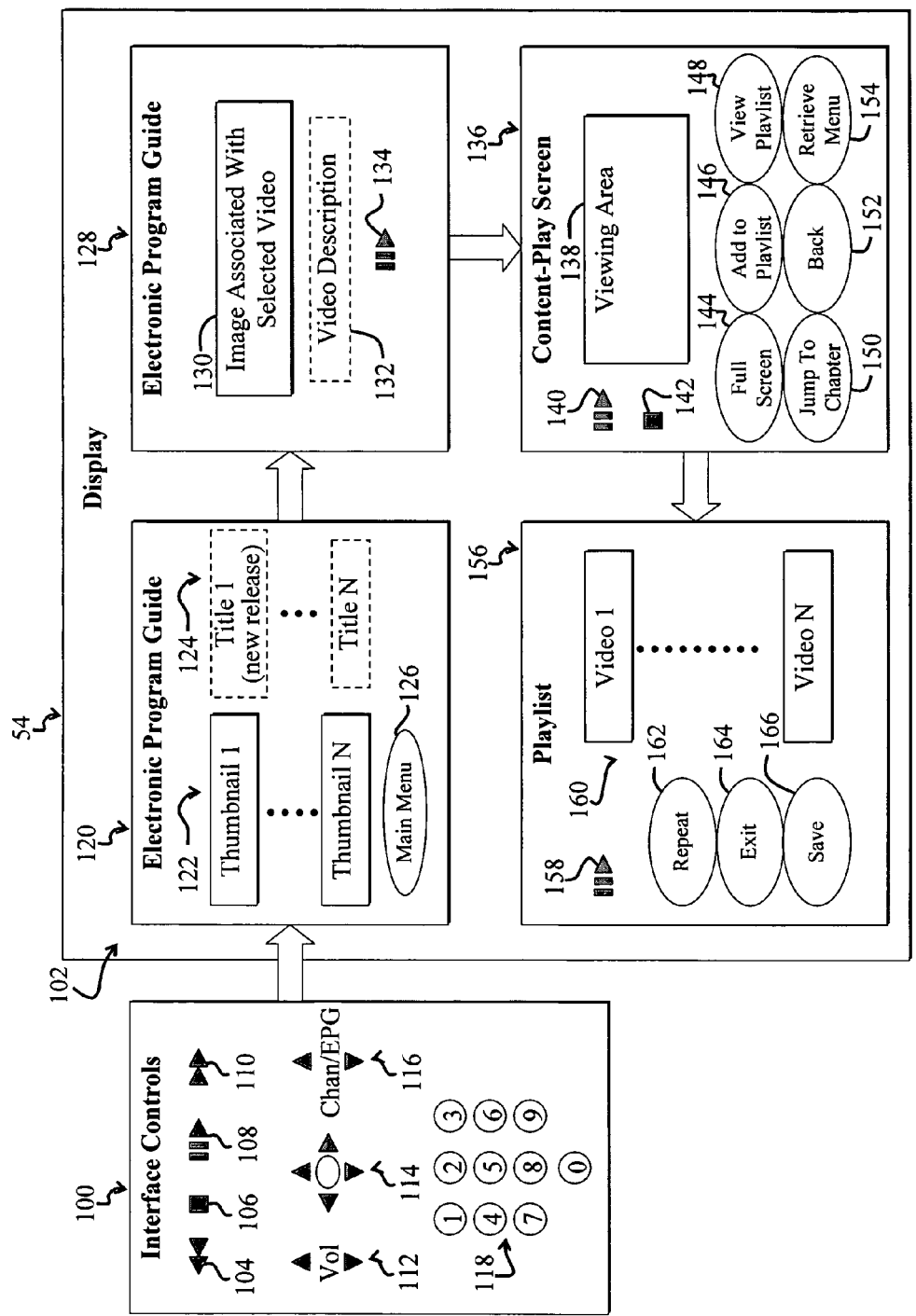
FIG. 2 is a diagram illustrating an exemplary set of user-interface controls and corresponding user-interface menus adapted for use with the system of FIG. 1.

FIG. 2 is a diagram illustrating an exemplary set of user-interface controls 100 and corresponding user-interface menus 102 adapted for use with the system 10 of FIG. 1. With reference to FIGS. 1 and 2, the interface controls 100 and the menus 102 of FIG. 2 facilitate implementing a portion of the interface controls 56 of FIG. 1. The interface controls 100 may be implemented via a remote control device that communicates with or is part of the client system 42 of FIG. 1.

The interface controls 100 include a rewind control 104, a stop control 106, a pause/play control 108, and a fast forward control 110, which communicate with the protocol-handling module 50 to trigger selective rewinding, stopping, pausing/playing, and fast forwarding of content retrieved by the client system 42 of FIG. 1. The interface controls 100 further include volume controls 112, menu-selection controls 114, channel-selection controls 116, and a numerical keypad 118. A user may employ the menu-selection controls 114 to navigate various menus 102. The channel-selection controls 116 enable a user to select video channels that are adjacent to the current video channel. The various controls 104-118 provide functionality that simulates functionality offered by a conventional DVD-player remote. The keypad 118 may facilitate content chapter selection or other functions afforded by the interface controls 56 of FIG. 2.

With reference to FIGS. 1 and 2, in the present illustrative scenario, a user employs the menu-then displays the EPG 120 via the display 54. The EPG 120 includes various thumbnails 122 that graphically depict movie choices. The thumbnails 122 are associated with adjacent descriptions 124, which include movie title and/or other descriptive matter. Other descriptive mater may, for example, indicate which movies are new releases, which movies have already been retrieved by the client system 42, and so on. The EPG 120 also includes a main-menu button 126, which may activate a main menu (not shown) upon selection.

In the present illustrative scenario, a user employs the menu-selection controls 114 to select one of the thumbnails 122 of the EPG 120. Subsequently, a corresponding EPG-description screen 128 appears in the display 54. The EPG-description screen 128 includes a larger descriptive image or video clip 130 associated with the movie that is associated with the selected thumbnail 122. The larger descriptive image 130 is positioned adjacent to a more detailed description 132, such as a summary, of the selected video. An adjacent pause/play button 134 enables a user to activate a content-play screen 136 to facilitate playing the video that is associated with the detailed image 130 and description 132. Alternatively, the user presses the pause/play button 108 of the interface control device 100 rather than selecting the button 134 via the menu-selection controls 114.

The content-play screen 136 includes a relatively large viewing area 138 adjacent to an additional pause/play button 140, stop button 142, full-screen button 144, audio-playlist button 146, view-playlist button 148, jump-to-chapter button 150, back button 152, and retrieve-menu button 154. The full-screen button 144 enables a user to play the movie using the entire area of the display 54. The add-to-playlist button 146 causes the current video to be added to a desired playlist. The jump-to-chapter button 150 enables a user to skip to a desired chapter of the currently selected video. The back button 152 enables a user to return to the previous screen. The retrieve-menu button 154 enables a user to retrieve menu information associated with the currently selected video from the server cluster 18 if it is not already available from the memory of the client system 42. The view-playlist button 148 activates a playlist screen 156.

The playlist screen 156 also includes a pause/play button 158 and a playlist 160 listing the current videos in the current playlist. A repeat button 162 enables a user to re-play a particular video. An exit button 164 enables a user to exit the playlist screen 156 and return to another screen, such as a the EPG screen 120. A save button 166 enables a user to save the current playlist 160.

The various screens 120, 128, 136, and 156 are shown for illustrative purposes. Various menu sequences are application specific. Exact screen details and/or menu sequences may be adjusted or changed without departing from the scope of the present invention.

Figure 3:
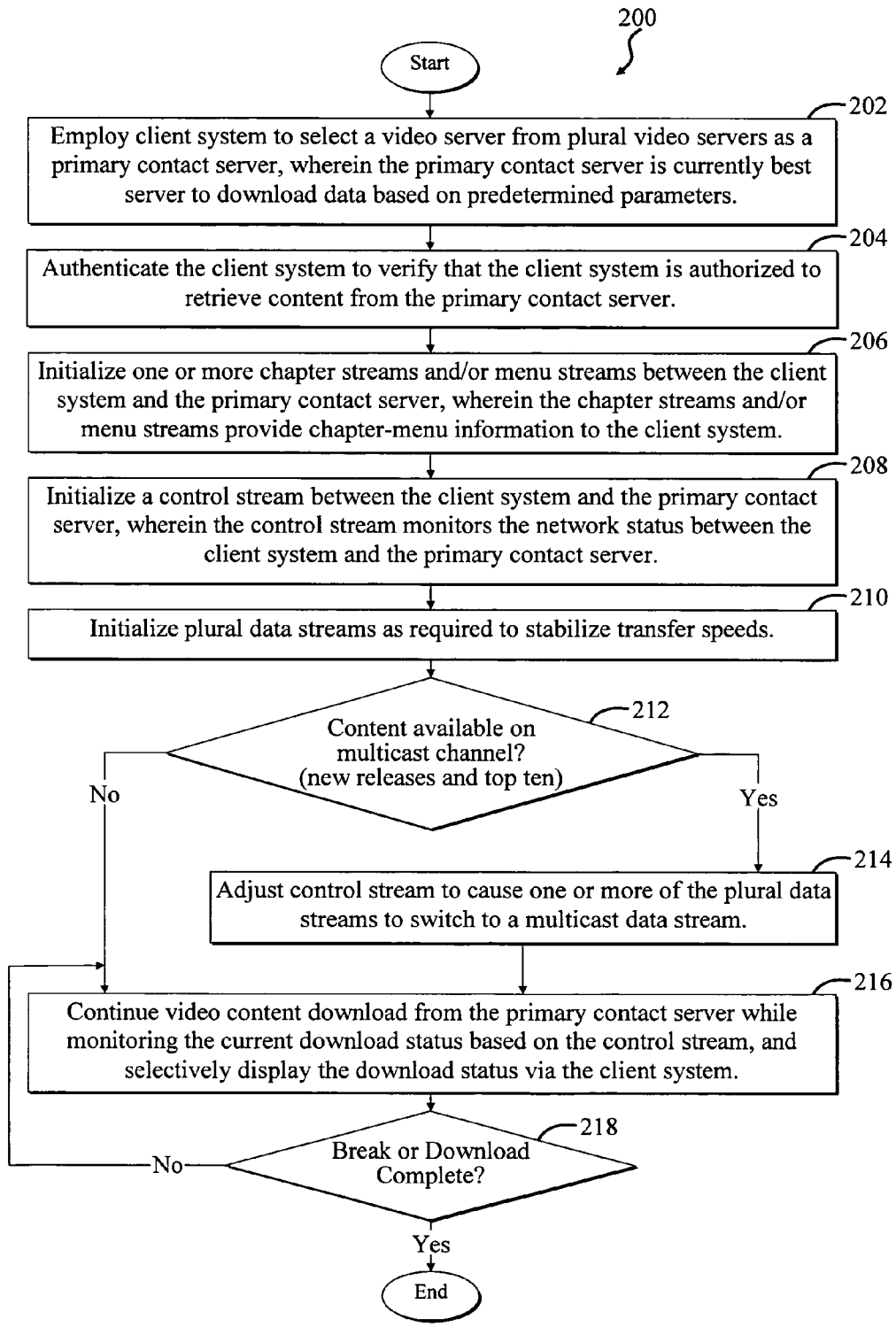
FIG. 3 is a flow diagram of a protocol for controlling data flow between a client and server system via a best-effort network adapted for use with the system of FIG. 1.

FIG. 3 is a flow diagram of a protocol 200 for controlling data flow between a client 42 and server system 16 via a best-effort network 14 adapted for use with the system 10 of FIG. 1. For the purposes of the present discussion, a protocol may be a method for regulating data transmission between one or more network elements. A network element may be any device connected to a network, such as a layer-2 switch, router, computer, and so on. A network may be any system comprising two or more entities or elements between which data may be transferred.

With reference to FIGS. 1 and 3, the protocol 200 includes an initial video-selection step 202, wherein a user employs a client system 42 to select a video server from plural video servers 18. The selected video server is called the primary contact server. The primary contact server is chosen to be the best server to download data based on predetermined parameters, which may be adjusted via the system-manager interface appliance 20 of FIG. 1.

In a subsequent authentication step 204, the client system 42 is authenticated to verify that the client system 42 is authorized to retrieve content from the primary contact server of the server cluster 18 of FIG. 1. After the client system 42 is authenticated via one or more processes 98 running on the server cluster 18, communication streams 44 are initialized in a first initialization step 206.

The first initialization step 206 involves initializing one or more chapter streams 82 and/or menu streams 80 between the client system 42 and the primary contact server. The chapter streams 82 and/or menu streams 80 provide chapter-menu information to the client system 42.

In a subsequent second initialization step 208, a control stream 78 between the client system 42 and the primary contact server is initialized. The control stream 42 monitors the status of the network 14 of FIG. 1. Plural corresponding content data streams 86-92 are initialized as required to stabilize content-transfer speeds in a third initialization step 210.

Subsequently, a multicast-checking step 212 involves determining if content to be transferred to the client system 42 is currently being multicast. If the content is currently being multicast, then a control-stream-adjustment step 214 is subsequently performed.

The control-stream-adjustment step 214 includes adjusting the control stream 78 to cause one or more of the plural data streams 86-92 to switch to corresponding multicast data streams 94. Content retrieval then resumes in a content-retrieval step 216. The status of a particular content-retrieval process may be displayed via the display 54 and/or via the browser interface 22 of FIG. 1.

In a subsequent break-checking step 218, the system 10 of FIG. 1 determines if a break has occurred or content transferring is otherwise complete. For example, a break occurs when the client system 42 of FIG. 1 is unplugged. If a break has not occurred, or the content has not been completely transferred to the client system 42, then content-transferring via step 216 resumes. If the multicast-checking step 212 determines that the content to be transferred is not being multicast, then video transferring continues via step 216.

Figure 4:
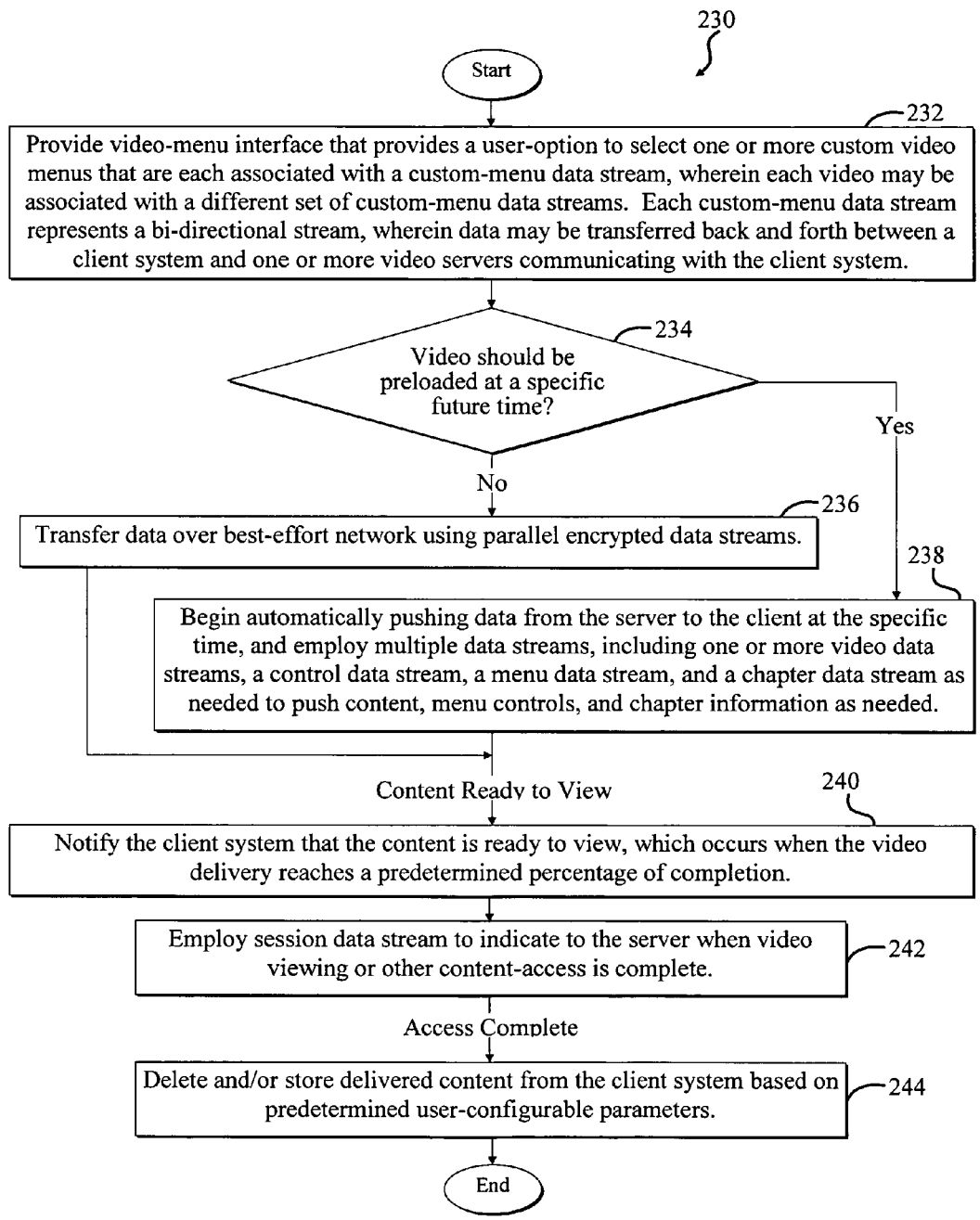
FIG. 4 is a flow diagram of a method for transferring content via a network adapted for use with the system of FIG. 1.

FIG. 4 is a flow diagram of a method 230 adapted for use with the system 10 of FIG. 1. With reference to FIGS. 1 and 4, the method 230 includes an initial menu-step 232 wherein a user of the client system 42 is provided with a video-menu interface. The video-menu interface, which is displayed via the display 54, provides a user-option to select one or more custom video menus that are each associated with a custom-menu data stream, such as the menu stream 80. Each video may be associated with a different set of menus and different corresponding custom-menu data streams. Each custom-menu data stream 80 is a bi-directional stream or channel between video servers of the server cluster 18 and the client system 18.

Subsequently, in a video-status-checking step 234, protocol-handling routines 50 running on the client system 42 determine, based on user into and/or preselected configuration settings, whether video content selected from the customized menu and/or electronic program guide should begin transferring from the server cluster 18 to the clients system 42 at a specific time. In some implementations, selected video will have already been transferred to the memory of the client system 42 or will be part of a pre-established content-pushing schedule.

If the video-status-checking step 234 determines that the selected video content is not to be pushed from the server cluster 18 to the client system 42, then content transfer begins immediately in a data-transferring step 236. The data-transferring step 236 employs parallel encrypted data streams 44 as needed to facilitate transferring the video and accompanying auxiliary content and control functionality. Before beginning content transfer, the server cluster 18 may authenticate the client system 42 to ensure that the client system 42 is authorized to receive content from the server cluster 18. Video data streams 44 may be encrypted by the content-distribution center 16 via a robust encryption technique, such as via Advanced Encryption System (AES) 128-bit encryption. The protocol-handling routines 50 of the client system 42 then employ corresponding AES decryption algorithms to decrypt the received content.

If the video-status-checking step 234 determines that the selected video should be scheduled for push at a subsequent future time, then the video content commences transfer from the server cluster 18 at the scheduled time in a pushing step 238. The video content is transferred via multiple data streams 44, including one or more video data streams 86-92 for implementing menu functionality, the control data stream 78, the chapter data stream 82, and the menu data stream 80.

After video-transfer is complete or reaches a point wherein the content is ready to view, the user of the client system 42 is notified that the content is ready to view in a content-notification step 240. A video may be accessed and viewed by a user of the client system 42 before video-transferring operations are complete. Notification mechanisms may include special thumbnails, icons, audio signals and/or other mechanisms, which may be implemented via one or more of the interface controls 56 and the display 54.

After the user of the client system 42 views the transferred content, a session data stream, which may be implemented via the control stream 78 of FIG. 1, is employed to notify the server cluster 18 that the transferred content has been viewed and accessed in a session-updating step 242. After the transferred content has been viewed by the user of the client system 42, the content is stored on the client system 42 and/or the content is deleted or scheduled for future deletion from the client system 42 by the content-distribution center 16 in a content-deleting step 244. Content-deletion tasks may be triggered and/or initiated by the content-distribution center 16 via the control stream 78. Deletion times and related parameters may be configured by an administrator via the system-manager interface appliance 20, and/or in some implementations, by a user of the client system 42. Subsequently, the method 230 is complete.

Various steps of the methods 200 and 230 of FIGS. 1 and 2, respectively may be reordered, deleted, or interchanged with other steps without departing from the scope of the present invention. For example, the initial menu step 232 may be omitted from the method 230. Furthermore, various loops may be adjusted. For example, after the break-checking step 216 of FIG. 3, the initial video-selection step 202 may be performed next instead of the protocol 200 ending.

Although the invention is discussed primarily with respect to content transferred over a best-effort network such as the Internet, any suitable network, network topology, transmission protocols, sender-receiver devices and relationships, and other characteristics or properties of electronic devices, processes and transmission methods can be used. In general, any network or communication arrangement can be suitable for use with embodiments of the invention. Also, any communication protocols or other features or characteristics of data transfer may be employed.

While the present embodiment is discussed with reference to systems and methods for facilitating transfer of video content over a network, embodiments of the present invention are not limited thereto. For example, any type of data, either wired or wireless may benefit from content-transfer functionality afforded by embodiments of the present invention.

Although embodiments of the invention are discussed primarily with respect to server-client architecture, any acceptable architecture, topology, protocols, or other network and digital processing features can be employed. In general, network controllers, managers, access points, clients, and so on, required for a particular implementation, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
receiving a signal from a user device to request content from a digital network;
streaming a portion of the requested digital content from a first location in the digital network to the user device by using multiple streams, wherein the multiple streams include one or more data streams, a control stream, a plurality of menu streams, a chapter stream, and an advertising stream;
displaying the streamed portion of the requested digital content on the user device, wherein the chapter stream enables the user at the user device to select or jump to viewing particular chapters which are being downloaded via the data streams;
receiving a signal from the user device to select a future portion of the requested digital content, wherein the future portion is a portion of the requested digital content that is not yet transferred to the user device by the data streams;
using the chapter stream to enable viewing of at least part of the selected future portion of the requested digital content;
displaying the future portion of the requested digital content in place of the streamed portion of the requested digital content, wherein the displaying enables a user to begin viewing a chapter of the future portion before the entire chapter is transferred to the user device;
using the control stream to adjust download parameters as needed for a particular download operation, wherein the control stream allows the user to control the number of data streams that are employed to retrieve content from the digital network;
using the control stream to implement a video-index data stream, wherein the video-index data stream enables fast forward and rewind video functions;
using the plurality of menu streams to display a plurality of custom menu options associated with the requested digital content, wherein the plurality of custom menu options provide a plurality of custom menus for the user, wherein the user is a single user, wherein the plurality of custom menus includes custom video menus, wherein the requested digital content includes video, wherein each video is associated with a plurality of custom video menus, wherein each custom video menu of the plurality of custom video menus corresponds to a different menu stream of the plurality of menu streams, wherein each custom video menu corresponds to a custom-menu data stream, wherein the menu stream provides a user-option to select one or more custom video menus, wherein each custom-menu data stream is a bi-directional stream, and wherein data is transferred back and forth between the user device and one or more video servers of the digital network, and wherein the requested digital content is transmitted via the one or more data streams;
determining a number of data streams based on latency in the digital network;
controlling the establishing of the determined number of streams by using the control stream;
determining a desired download rate;
determining a desired fluctuation of a download rate;
monitoring network latency and congestion parameters and providing a signal in response thereto;
receiving from the user device a selection of a specific number of communication streams so as to stabilize the content-transfer rate in accordance with the desired download rate, the desired fluctuation of the download rate, and the signal;
pushing a top predetermined number of digital content requested by user of the digital network and a predetermined number of latest releases of digital content before the user requests the digital content, wherein the pushed content is transmitted to the user device via a plurality of data streams;
checking whether the requested digital content is being multicast on one or more of the data streams; and if so, then using one or more multicast streams to display the requested digital content; and
using the advertising stream to present advertisements for display to the user.

2. The method of claim 1, wherein the adjusting of the download parameters comprises:
running routines to monitor one or more of transmission progress, network performance, and latency characteristics; and
increasing or decreasing the number of data streams employed to transfer the content over the digital network.

3. An apparatus comprising:
a processor;
a processor-readable storage device including instructions executable by the processor for:
receiving a signal from a user device to request content from a digital network;
streaming a portion of the requested digital content from a first location in the digital network to the user device by using multiple streams, wherein the multiple streams include one or more data streams, a control stream, a plurality of menu streams, a chapter stream, and an advertising stream;
displaying the streamed portion of the requested digital content on the user device, wherein the chapter stream enables the user at the user device to select or jump to viewing particular chapters which are being downloaded via the data streams;
receiving a signal from the user device to select a future portion of the requested digital content, wherein the future portion is a portion of the requested digital content that is not yet transferred to the user device by the data streams;
using the chapter stream to enable viewing of at least part of the selected future portion of the requested digital content;
displaying the future portion of the requested digital content in place of the streamed portion of the requested digital content, wherein the displaying enables a user to begin viewing a chapter of the future portion before the entire chapter is transferred to the user device;
using the control stream to adjust download parameters as needed for a particular download operation, wherein the control stream allows the user to control the number of data streams that are employed to retrieve content from the digital network;
using the control stream to implement a video-index data stream, wherein the video-index data stream enables fast forward and rewind video functions;
using the plurality of menu streams to display a plurality of custom menu options associated with the requested digital content, wherein the plurality of custom menu options provide a plurality of custom menus for the user, wherein the user is a single user, wherein the plurality of custom menus includes custom video menus, wherein the requested digital content includes video, wherein each video is associated with a plurality of custom video menus, wherein each custom video menu of the plurality of custom video menus corresponds to a different menu stream of the plurality of menu streams, wherein each custom video menu corresponds to a custom-menu data stream, wherein the menu stream provides a user-option to select one or more custom video menus, wherein each custom-menu data stream is a bi-directional stream, and wherein data is transferred back and forth between the user device and one or more video servers of the digital network, and wherein the requested digital content is transmitted via the one or more data streams;

determining a number of data streams based on latency in the digital network;

controlling the establishing of the determined number of streams by using the control stream;

determining a desired download rate;

determining a desired fluctuation of a download rate;

monitoring network latency and congestion parameters and providing a signal in response thereto;

receiving from the user device a selection of a specific number of communication streams so as to stabilize the content-transfer rate in accordance with the desired download rate, the desired fluctuation of the download rate, and the signal;

pushing a top predetermined number of digital content requested by user of the digital network and a predetermined number of latest releases of digital content before the user requests the digital content, wherein the pushed content is transmitted to the user device via a plurality of data streams;

checking whether the requested digital content is being multicast on one or more of the data streams; and if so, then using one or more multicast streams to display the requested digital content; and using the advertising stream to present advertisements for display to the user.

4. A non-transitory computer readable medium including instructions executable by a processor, the non-transitory computer readable medium comprising one or more instructions for:

receiving a signal from a user device to request content from a digital network;

streaming a portion of the requested digital content from a first location in the digital network to the user device by using multiple streams, wherein the multiple streams include one or more data streams, a control stream, a plurality of menu streams, a chapter stream, and an advertising stream;

displaying the streamed portion of the requested digital content on the user device, wherein the chapter stream enables the user at the user device to select or jump to viewing particular chapters which are being downloaded via the data streams;

receiving a signal from the user device to select a future portion of the requested digital content, wherein the future portion is a portion of the requested digital content that is not yet transferred to the user device by the data streams;

using the chapter stream to enable viewing of at least part of the selected future portion of the requested digital content;

displaying the future portion of the requested digital content in place of the streamed portion of the requested digital content, wherein the displaying enables a user to begin viewing a chapter of the future portion before the entire chapter is transferred to the user device;

using the control stream to adjust download parameters as needed for a particular download operation, wherein the control stream allows the user to control the number of data streams that are employed to retrieve content from the digital network;

using the control stream to implement a video-index data stream, wherein the video-index data stream enables fast forward and rewind video functions;

using the plurality of menu streams to display a plurality of custom menu options associated with the requested digital content, wherein the plurality of custom menu options provide a plurality of custom menus for the user, wherein the user is a single user, wherein the plurality of custom menus includes custom video menus, wherein the requested digital content includes video, wherein each video is associated with a plurality of custom video menus, wherein each custom video menu of the plurality of custom video menus corresponds to a different menu stream of the plurality of menu streams, wherein each custom video menu corresponds to a custom-menu data stream, wherein the menu stream provides a user-option to select one or more custom video menus, wherein each custom-menu data stream is a bi-directional stream, and wherein data is transferred back and forth between the user device and one or more video servers of the digital network, and wherein the requested digital content is transmitted via the one or more data streams;

determining a number of data streams based on latency in the digital network; controlling the establishing of the determined number of streams by using the control stream;

determining a desired download rate;

determining a desired fluctuation of a download rate;

monitoring network latency and congestion parameters and providing a signal in response thereto:

receiving from the user device a selection of a specific number of communication streams so as to stabilize the content-transfer rate in accordance with the desired download rate, the desired fluctuation of the download rate, and the signal;

pushing a top predetermined number of digital content requested by user of the digital network and a predetermined number of latest releases of digital content before the user requests the digital content, wherein the pushed content is transmitted to the user device via a plurality of data streams;

checking whether the requested digital content is being multicast on one or more of the data streams; and if so, then using one or more multicast streams to display the requested digital content; and using the advertising stream to present advertisements for display to the user.

* * * * *